United States Patent
Park et al.

(10) Patent No.: US 9,866,271 B2
(45) Date of Patent: Jan. 9, 2018

(54) INTERFERENCE MITIGATION APPARATUS AND INTERFERENCE MITIGATION METHOD FOR HOME NETWORK TRANSMISSION LINE, AND COMMUNICATION SYSTEM USING SAME

(71) Applicant: KT CORPORATION, Gyeonggi-do (KR)

(72) Inventors: Nowook Park, Gyeonggi-do (KR); Hyung-Jin Park, Seoul (KR); In-Taek Jeong, Daejeon (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/037,715

(22) PCT Filed: Sep. 29, 2014

(86) PCT No.: PCT/KR2014/009131
§ 371 (c)(1),
(2) Date: May 19, 2016

(87) PCT Pub. No.: WO2015/076492
PCT Pub. Date: May 28, 2015

(65) Prior Publication Data
US 2016/0301447 A1    Oct. 13, 2016

(30) Foreign Application Priority Data

Nov. 25, 2013   (KR) .................. 10-2013-0143972
Sep. 1, 2014    (KR) .................. 10-2014-0115445

(51) Int. Cl.
*H04B 3/32*      (2006.01)
*H04B 15/00*     (2006.01)
(Continued)

(52) U.S. Cl.
CPC ............... *H04B 3/32* (2013.01); *H04B 3/46* (2013.01); *H04B 3/54* (2013.01); *H04L 5/0048* (2013.01);
(Continued)

(58) Field of Classification Search
CPC ... H04B 3/32; H04B 3/54; H04B 3/46; H04B 15/00; H04L 25/0204; H04L 7/0091; H04L 25/0224; H04L 5/0048; H04L 7/0079
See application file for complete search history.

(56) References Cited

U.S. PATENT DOCUMENTS 3,403,381 A * 9/1968 Haner .................. G08C 15/00
                                              340/12.11
5,369,591 A * 11/1994 Broxmeyer .......... G05D 1/0261
                                              180/167

(Continued)

FOREIGN PATENT DOCUMENTS

JP        2009-055585 A    3/2009
KR   10-2009-0050286 A     5/2009

*Primary Examiner* — Jean B Corrielus
(74) *Attorney, Agent, or Firm* — IP Legal Services, LLC

(57) ABSTRACT

Provided is a method for mitigating, by an interference mitigation apparatus, interference on a home network transmission line. The method includes pairing domain masters with relay terminals by a signal having a unique frequency, grouping the domain masters, performing Tx/Rx synchronization between the domain masters and the relay terminals, and controlling the domain masters and the relay terminals to transmit/receive data according to the Tx/Rx synchronization. The domain masters of the same groups may be controlled not to simultaneously transmit/receive data.

16 Claims, 6 Drawing Sheets

(51) Int. Cl.
    *H04B 3/46*     (2015.01)
    *H04B 3/54*     (2006.01)
    *H04L 5/00*     (2006.01)
    *H04L 7/00*     (2006.01)
    *H04L 25/02*     (2006.01)

(52) U.S. Cl.
    CPC .......... H04L 7/0079 (2013.01); H04L 7/0091 (2013.01); H04L 25/0204 (2013.01); H04L 25/0224 (2013.01); *H04B 15/00* (2013.01)

(56) References Cited

U.S. PATENT DOCUMENTS

| | | | | |
|---|---|---|---|---|
| 6,202,929 | B1 * | 3/2001 | Verschuur | G06K 7/081 |
| | | | | 235/449 |
| 8,472,383 | B1 * | 6/2013 | Banerjea | H04B 7/0697 |
| | | | | 370/328 |
| 8,666,313 | B2 * | 3/2014 | Preston | H04W 8/005 |
| | | | | 370/310 |
| 9,379,794 | B2 * | 6/2016 | Du | H04B 7/0452 |
| 2008/0225687 | A1 | 9/2008 | Oksman | |
| 2012/0023237 | A1 | 1/2012 | Lurie et al. | |
| 2012/0087229 | A1 | 4/2012 | Mantri | |
| 2012/0147934 | A1 | 6/2012 | Vazquez et al. | |
| 2014/0086039 | A1 | 3/2014 | Mantri | |
| 2015/0139122 | A1 * | 5/2015 | Rimini | H04B 1/123 |
| | | | | 370/329 |

* cited by examiner

INTERFERENCE MITIGATION APPARATUS AND INTERFERENCE MITIGATION METHOD FOR HOME NETWORK TRANSMISSION LINE, AND COMMUNICATION SYSTEM USING SAME

CROSS REFERENCE TO RELATED APPLICATIONS

This application is a National Stage Patent Application of PCT International Patent Application No. PCT/KR2014/009131 (filed on Sep. 29, 2014) under 35 U.S.C. §371, which claims priority to Korean Patent Application Nos. 10-2013-0143972 (filed on Nov. 25, 2013) and 10-2014-0115445 (filed on Sep. 1, 2014), the teachings of which are incorporated herein in their entireties by reference.

TECHNICAL FIELD

The present disclosure relates to an interference mitigation apparatus and an interference mitigation method for home network transmission line and communication system using same.

BACKGROUND ART

Typically, based on a very high bit rate digital subscriber line (VDSL) technology, an uplink/downlink frequency division multiplexing (FDM) scheme has been used for indoor telephone lines to achieve a transmission speed of up to about 100 Mbps by applying a maximum of about 30 MHz frequency band.

In the related art, a bonding technology has been used to provide a speed of a gigabit per second exceeding about 100 Mbps. However, such a bonding technology requires at least two or more pairs. Accordingly, it has been difficult to achieve a speed of up to 200 Mbps without increasing the number of pairs.

In order to provide gigabit Internet access to a typical environment implemented with VDSL according to the related art, it is required to replace all existing VDSL systems with new systems or to modify the typical environment to FTTH (Fiber to the home). Such replacement and modification requires excessive cost.

It may be possible to archive a same goal by implementing a system with FTTH-G (G.hn). Such FTTH-G provides a speed of about 100 Mbps or more and requires a comparatively lower cost. However, in this case, it demands a method for mitigating interference in a wire bundle environment where interference noise is generated in a subscriber aggregation area.

The above information disclosed in this Background section is only to enhance the understanding of the background of the disclosure and therefore it may contain information that does not form the prior art that is already known in this country to a person of ordinary skill in the art.

DISCLOSURE

Technical Problem

Embodiments of the present disclosure have been made in an effort to propose an interference mitigation apparatus and an interference mitigation method for home network transmission line and communication system using same.

Technical Solution

According to an embodiment of the present disclosure, a method may be provided for mitigating, by an interference mitigation apparatus, interference on a home network transmission line. The method includes pairing domain masters with relay terminals by a signal having a unique frequency, grouping the domain masters, achieving Tx/Rx synchronization between the domain masters and the relay terminals, and controlling the domain masters and the relay terminals to transmit/receive data according to the Tx/Rx synchronization. The domain masters of the same groups may be controlled not to simultaneously transmit/receive data.

The pairing may include transmitting, by the domain masters, a pairing pulse signal pre-allocated to each port to the relay terminals, and receiving, by the domain master, the pairing pulse signal including information about the relay terminals and selecting the relay terminal to be paired for each domain master.

The grouping of the domain masters may include grouping the domain masters causing interference by using status information of channels.

The status information of the channels may include information estimated by comparing test signals transmitted/received between the domain master and the relay terminal, which are paired.

The method may further include, between the pairing and the grouping of the domain masters, estimating channels by comparing test signals transmitted/received between the domain masters and the relay terminals which are paired. The estimating of the channels may include instructing the domain masters to transmit a PROBE frame for channel estimation as a test signal, receiving the PROBE frame from the relay terminals paired with the domain masters, and estimating channels by comparing the received PROBE frame with a predetermined PROBE frame.

The performing may include achieving the Tx/Rx synchronization by varying a ratio of a downlink and an uplink according to an amount of data.

The performing Tx/Rx synchronization may further include providing a MAC cycle synchronization signal by varying the ratio of the downlink and the uplink according to an amount of data being queued, when bandwidths and ratios of a downlink and an uplink are different.

According to another embodiment of the present disclosure, an apparatus for interference mitigation includes a pairing unit configured to pair domain masters with relay terminals by transmitting/receiving a signal having a unique frequency, and a control unit configured to group the domain masters using status information of channels and to control the grouped domain masters to transmit/receive data.

The control unit may include a grouping unit configured to group the domain masters causing interference and a synchronizing unit configured to perform Tx/Rx synchronization between the domain master and the relay terminal, which are paired. The control unit may control the domain masters and the relay terminals to transmit/receive data according to the Tx/Rx synchronization and control the grouped domain masters not to simultaneously transmit/receive data.

The grouping unit may group the domain masters causing interference by using the status information of the channels. The status information of the channels may include information that is estimated by comparing test signals transmitted/received between the domain masters and the relay terminals, which are paired.

The apparatus may further include a channel estimation unit configured to estimate channels by comparing test signals transmitted/received between the domain masters and the relay terminals, which are paired.

The channel estimation unit may include a comparing unit that transmits/receives a PROBE frame between the domain masters and the relay terminals, which are paired, and compares the PROBE frame received by the domain masters with a predetermined PROBE frame.

When bandwidths and ratios of the downlink and the uplink are different between the domain masters and the relay terminals, which are paired, the synchronizing unit may perform Tx/Rx synchronization by varying the ratio of the downlink and the uplink according to an amount of data being queued and by providing a synchronization signal such as a MAC cycle.

According to yet another embodiment of the present disclosure, a communication system includes one or more relay terminals paired with domain masters and connected to the paired domain masters via transmission lines, an interference mitigation apparatus that controls registering the relay terminals paired with the domain masters and synchronizing the domain masters so as to transmit/receive data, and a server that calculates interference data of channels based on a channel status for each port and provides the calculated the interference data to the interference mitigation apparatus so as to synchronize the domain masters.

The interference mitigation apparatus may group the domain masters based on the interference data such that the domain masters are not affected by interference.

The interference mitigation apparatus may control performing Tx/Rx synchronization of the grouped domain masters and allowing the grouped domain masters to transmit data to and to receive data from the relay terminals according to the Tx/Rx synchronization. The interference mitigation apparatus may group the domain masters causing interference by using channel status information. The channel status information may include information that estimated by comparing test signals transmitted/received between the domain master and the relay terminal that are paired.

Advantageous Effects

According to at least one embodiment of the present disclosure, interferences in a transmission line may be minimized by pairing domain masters and relay terminals through the pairing pulse signal selecting domain maters having comparatively large interferences based on a result of estimating channels, grouping the selected domain maters, and transmitting and receiving through the grouped domain masters.

In addition, according to at least one embodiment of the present disclosure, interference on a transmission line may be minimized by controlling domain masters and relay terminals to transmit and receive data according to Tx/Rx synchronization and by controlling domain masters belonging to the same group not to transmit and receive data at the same time.

MODE FOR INVENTION

Figure 1:
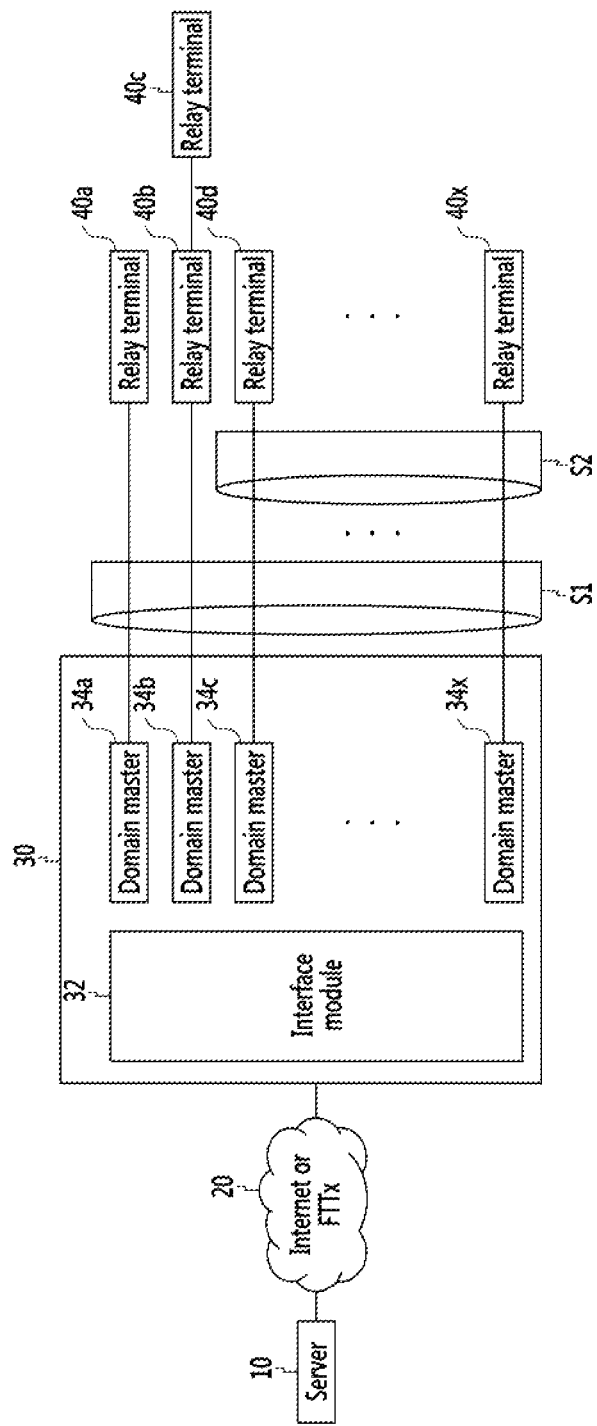
FIG. 1 is a schematic block diagram of a communication system for relaying a home network signal according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive, and like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Hereinafter, referring to FIGS. 1 to 6, an interference mitigation apparatus and an interference mitigation method for home network transmission line, and communication system using the same are described in detail.

FIG. 1 is a schematic block diagram of a communication system for relaying a home network signal according to an exemplary embodiment of the present disclosure. In this case, the communication system is schematically illustrated with constituent elements necessary to describe the exemplary embodiment of the present disclosure. Embodiments of the present disclosure are not limited thereto.

Referring to FIG. 1, the communication system for relaying a home network signal according to the current exemplary embodiment of the present disclosure includes a server 10, a home network signal relay apparatus 30, and a plurality of relay terminals 40.

In accordance with at least one embodiment, the communication system for relaying a home network signal includes an access network and a home network. The access network relays a signal and is also referred to as an access area. The home network is referred to as a home area. Herein, the access network relays a signal of Internet network to a plurality of home areas. The home network receives a signal related from the access network and provides the relayed signal to a service provider's terminal and a home user's terminal (not shown).

In this case, an optical cable may be used to connect the server 10 to the access area, and the home network signal relay apparatus 30 may be provided between the access area and the home area. In the home area, a service is provided by transmitting a signal from the home network signal relay apparatus 30 to a relay terminal 40 or an end point (EP) through various kinds of copper wire bundle cables that are connected to each subscriber.

The server 10 is connected to the home network signal relay apparatus 30 via the optical cable through Internet or FTTx (Fiber to the x) 20. The server 10 is connected to the home network signal relay apparatus 30 through an interface module 32 for interfacing an existing network including a passive optical network (PON) or L2/L3 switches. The server 10 performs service policy management and network management.

Figure 2:
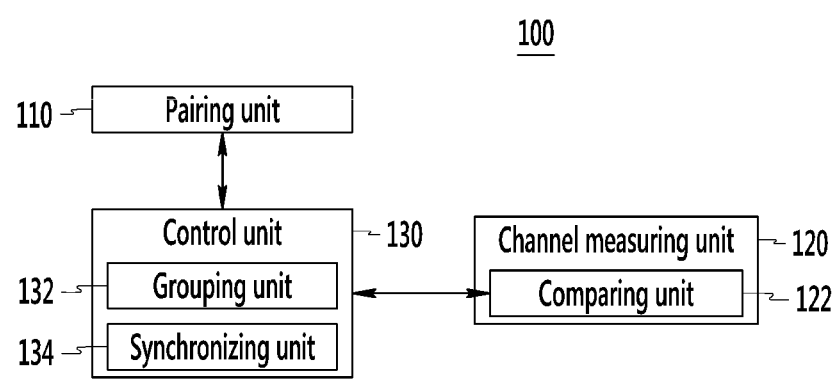
FIG. 2 is a schematic block diagram of a configuration of an interference mitigation apparatus according to an exemplary embodiment of the present disclosure.

In accordance with at least one embodiment, the server 10 may receive an estimated channel status, calculate interference data of a channel based on the received channel status, and provide the interference data calculated to synchronize domain masters 34a to 34x to one of the home network signal relay apparatus 30 and an interference mitigation apparatus 100 (referring to FIG. 2).

According to the embodiment of the present disclosure, the home network signal relay apparatus 30 may include the interference mitigation apparatus 100. In this case, the interference mitigation apparatus 100 includes a control unit that registers the relay terminals paired with the domain masters, uses a test signal to estimate a channel status for each port, and synchronizes the domain masters to transmit and receive data.

The domain masters 34a to 34x are respectively paired with one or more relay terminals 40a to 40x. The domain masters 34a to 34x may be connected to the relay terminals 40a to 40x via one or more transmission lines S1 and S2.

A configuration of the interference mitigation apparatus 100 will now be described in detail with reference to FIG. 2.

FIG. 2 is a schematic block diagram illustrating an interference mitigation apparatus according to an exemplary embodiment of the present disclosure. In FIG. 2, the interference mitigation apparatus 100 is schematically illustrated to constituent elements necessary to describe the exemplary embodiment of the present disclosure. The embodiments of the present disclosure are not limited thereto.

Referring to FIG. 2, the interference mitigation apparatus 100 includes a pairing unit 110, a channel measuring unit 120, and a control unit 130.

The pairing unit 110 pairs the domain masters 34a to 34x with the relay terminals 40a to 40x using pairing pulse signals each having a unique frequency. In order to pair, the pairing unit 110 controls the domain masters 34a to 34x and the relay terminals 40a to 40x to transmit and receive the pairing pulse signals which are pre-allocated to each port.

Figure 3:
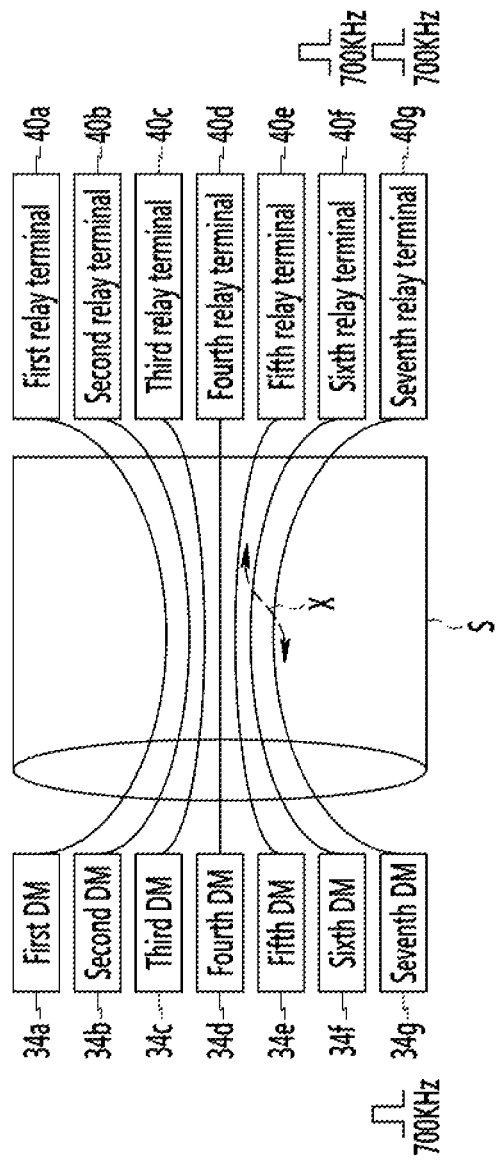
FIG. 3 is a diagram for describing an operation for pairing by transmitting and receiving pairing pulse signals each having a unique frequency.

FIG. 3 is a diagram for describing an operation for pairing by transmitting and receiving pairing pulse signals each having unique frequency.

Referring to FIG. 3, the domain masters 34a to 34g transmit the pairing pulse signals that are pre-allocated to each port to the relay terminals 40a to 40g. In this case, the pairing pulse signal may leak into an adjacent channel via crosstalk X.

After receiving the pairing pulse signals from the domain master 34g, the relay terminals 40f and 40g identify frequencies and transmit the same pairing pulse signals as those of the corresponding frequencies to the domain master 34g. Even in this case, the pairing pulse signal transmitted by the relay terminal 40f may also leak into the adjacent channel via crosstalk X.

The domain master 34g may receive the pairing pulse signals from the relay terminals 40f and 40g and may select one that has high signal strength. Information about the relay terminals, such as a media access control (MAC) address, may be included in the pairing pulse signals that are received from the relay terminals 40f and 40g.

In FIG. 3, the domain master 34g does not receive the pairing pulse signal transmitted by the relay terminal 40f since the frequency thereof is not the frequency pre-allocated to the corresponding port. The domain master 34g selects the relay terminal 40g and set up paring with the selected relay terminal 40g.

The channel measuring unit 120 estimates a status of the corresponding channel by using test signals transmitted/received between the domain masters and the relay terminals. In this case, the channel measuring unit 120 may, as shown in FIG. 3, estimate the channel status between the domain master 34g and the relay terminal 40g that are paired.

The channel measuring unit 120 instructs the relay terminal 40g paired with the domain master 34g to transmit/receive a PROBE frame for channel estimation as the test signal, and the domain master 34g receives the PROBE frame from the paired relay terminal 40g. In this case, the domain master 34g and the relay terminal 40g know the PROBE frame for channel estimation in advance.

Herein, in accordance with at least one embodiment, the channel measuring unit 120 includes a comparing unit 122 that transmits/receives the PROBE frame between the domain master and the relay terminal, which are paired, and compares the PROBE frame received by the domain master with a predetermined PROBE frame. The channel measuring unit 120 estimates a channel status by comparing the PROBE frame received by the domain master via the comparing unit 122 with the predetermined PROBE frame.

The control unit 130 groups the domain masters of the channels having much interference using status information of the channels that are estimated by the channel measuring unit 120. The control unit 130 controls the grouped domain maters to transmit/receive data.

In the interference mitigation apparatus 100 according to the embodiment of the present disclosure, the channel measuring unit 120 may measure status information of the transmission line, and the control unit 130 may determine the domain masters with much interference based on the measured status information, group the determined domain maters into small groups to transmit/receive data.

In accordance with at least one embodiment, the control unit 130 includes a grouping unit 132 and a synchronizing unit 134.

When transmitting data, the grouping unit 132 groups the domain masters that cause interference. In this case, in order to minimize influence of interference when the domain masters transmit data, the grouping unit 132 identifies the domain masters that cause interference with respect to each other and divides them into small groups.

The grouping unit 132 may group the domain masters with much interference, using the channel status information. Herein, the channel status information includes information that is estimated by comparing the test signals transmitted/received between the domain master and the relay terminal that are paired.

The synchronizing unit 134 may achieve Tx/Rx synchronization for data transmission between the domain master and the relay terminal that are paired. Or, the synchronizing unit 134 may achieve Tx/Rx synchronization between the grouped domain masters or between the grouped groups.

In this case, the synchronizing unit 134 may achieve the Tx/Rx synchronization by varying a ratio of a downlink and an uplink depending on an amount of data transmitted/received between the domain master and the relay terminal. When bandwidths and ratios of the downlink and the uplink are different between the domain master and the relay terminal that are paired, the synchronizing unit 134 may vary the ratio of the downlink and the uplink depending on an amount of data being queued, and the synchronizing unit 134 may provide a synchronization signal such as a MAC cycle to achieve Tx/Rx synchronization.

Figure 4:
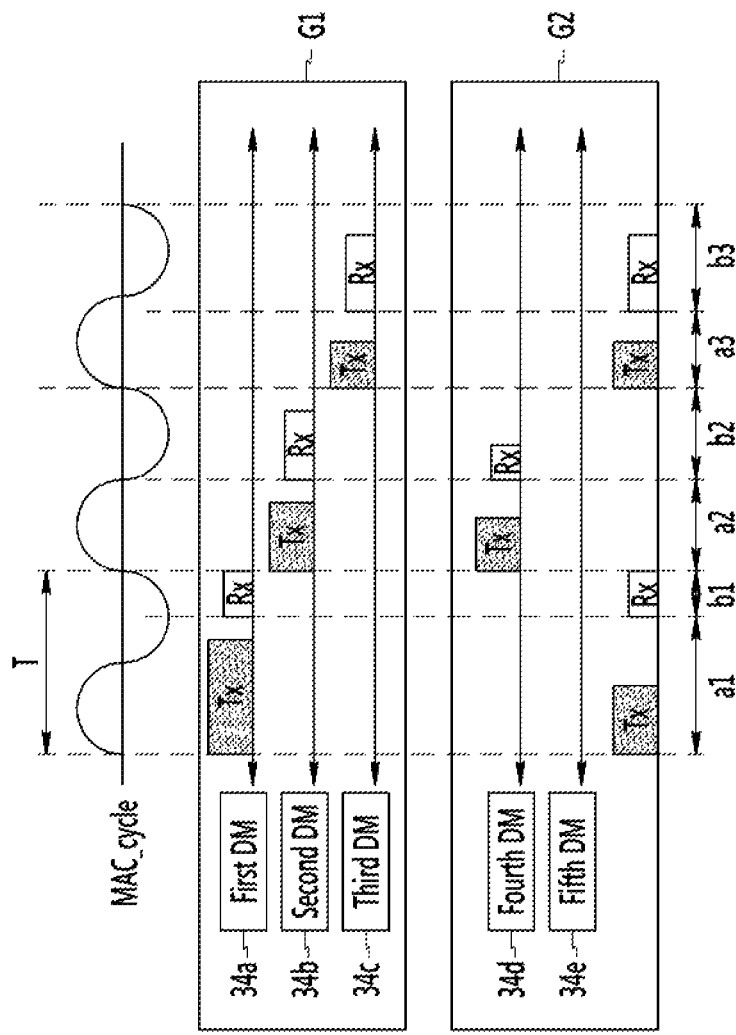
FIG. 4 is a diagram for describing an operation of grouped domain masters for transmitting and receiving data according to Tx/Rx synchronization.

FIG. 4 is a diagram for describing grouped domain masters transmitting and receiving data according to Tx/Rx synchronization. The following flowcharts will be described using the same reference numerals in conjunction with the configurations of FIG. 1 to FIG. 2.

Referring to FIG. 4, domain masters 34a, 34b, and 34c are grouped as a first group G1, and domain masters 34d and 34e are grouped as a second group G2. In this case, the domain masters of the same groups may have much interference therebetween.

The first domain master 34a, the second domain master 34b, and the third domain master 34c have interference therebetween, and the fourth domain master 34d and the fifth domain master 34e have interference therebetween.

Since the first domain master 34a, the second domain master 34b, and the third domain master 34c of the first group G1 are grouped in the same group, they cannot simultaneously transmit/receive data within the same cycle, but they may simultaneously transmit data to and receive data from the fourth domain master 34d of the second group G2.

That is, when the first domain master 34a transmits/receives data, the second domain master 34b or the third domain master 34c may not transmit/receive data, and the fourth domain master 34d may transmit/receive data.

In order to alleviate interference, the interference mitigation apparatus 100 controls the domain masters to be synchronized with a MAC cycle in order to simultaneously transmit/receive data at a point where the MAC cycle begins.

In this case, the synchronizing unit 134 may, depending on an amount of data transmitted/received between the domain master and the relay terminal or bandwidths or ratios of a downlink and an uplink, may vary the ratio of the downlink and the uplink, and may provide a MAC cycle synchronization signal to achieve Tx/Rx synchronization.

That is, when bandwidths and ratios of the downlink and the uplink have different since each user has a different service plan and thus has a different amount of data transmitted/received, the interference mitigation apparatus 100 vary the ratio of the downlink and the uplink according to an amount of data queued in the interface module 32 and may provide the varied ratio and the MAC cycle synchronization signal to the domain masters.

FIG. 4 illustrates that when the MAC cycle synchronization signal has a cycle of T, the domain masters are controlled to transmit data by changing the ratio of the downlink and the uplink to a1 and b1, a2 and b2, and a3 and b3, depending on amounts of data of the domain masters within the cycle T. In this case, the domain masters internally include a buffer and may enhance data efficiency according to a TDM scheme.

A process of an interference mitigation apparatus 100 for mitigating interference on a home network transmission line will now be described in detail with reference to FIG. 5.

Figure 5:
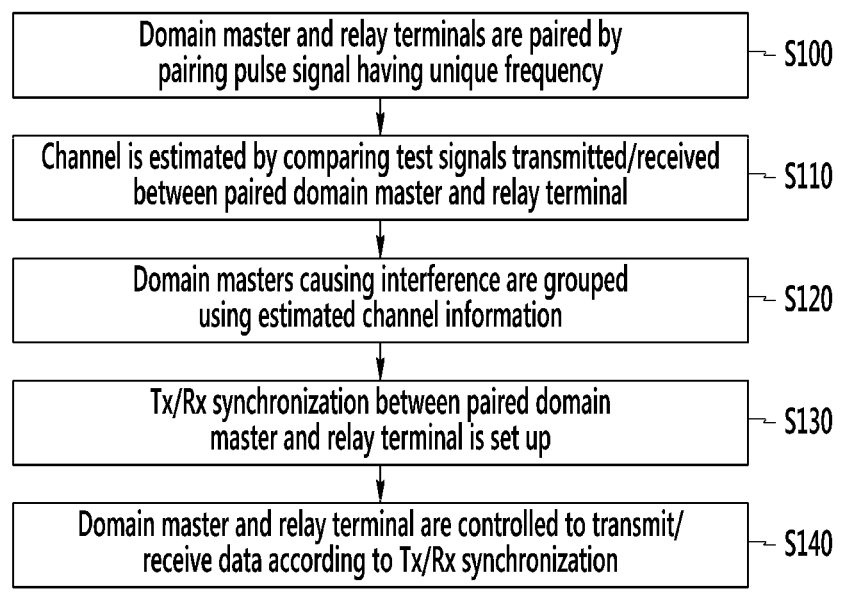
FIG. 5 is a flowchart illustrating a method for mitigating interference according to another exemplary embodiment of the present disclosure.

FIG. 5 is a flowchart illustrating a method for mitigating interference according to another exemplary embodiment of the present disclosure. The following flowchart will be described using the same reference numerals in conjunction with the configurations of FIG. 1 to FIG. 2.

Referring to FIG. 5, in the interference mitigation apparatus 100, a pairing unit 110 pairs domain masters with relay terminals by a pairing pulse signal with a unique frequency (S100).

The interference mitigation apparatus 100 estimates channels by comparing test signals transmitted/received between the domain masters and relay terminals that are paired, and the domain masters causing interference are grouped using estimated channel information (S110 and S120).

The interference mitigation apparatus 100 achieves Tx/Rx synchronization between the domain master and the relay terminal, which are paired, and controls the domain masters and the relay terminals to transmit/receive data according to the Tx/Rx synchronization (S140). In this case, the interference mitigation apparatus 100 controls the domain masters of the same groups not to simultaneously transmit data according to the grouping.

A process of a communication system for relaying a home network signal mitigates interference by using an interference mitigation apparatus 100 will now be described in detail.

Figure 6:
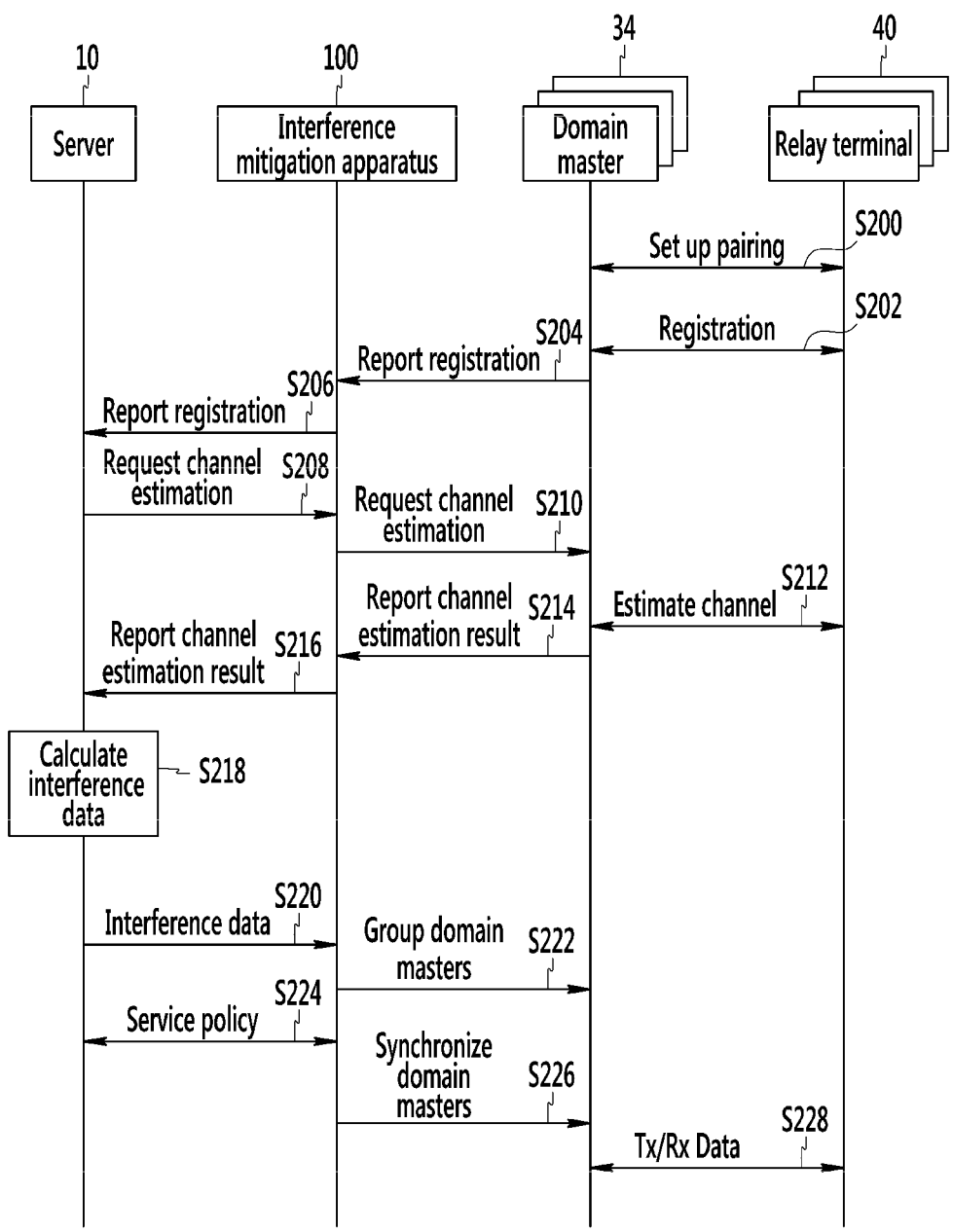
FIG. 6 is a flowchart illustrating a process of estimating channels to mitigate interference in a communication system.

FIG. 6 is a flowchart illustrating a process of estimating channels to mitigate interference in a communication system. The following flowchart will be described using the same reference numerals in conjunction with the configurations of FIG. 1 to FIG. 2.

Referring to FIG. 6, domain masters 34 and relay terminals 40 are paired, the paired devices are registered, and the results are reported to a server 10 via an interference mitigation apparatus 100 (S200 to S206).

When the server 10 requests to estimation of channels between the domain masters and the relay terminals, which are paired, the interference mitigation apparatus 100 reports channel estimation results of the domain masters and the relay terminals, which are paired, to the server 10 (S208 to S216).

In addition, the server 10 uses the channel estimation results to calculate interference data and provides the calculated interference data (S218 and S220).

The interference mitigation apparatus 100 uses the interference data provided by the server 10 to group the domain masters, and the interference mitigation apparatus 100 synchronizes the domain masters according to a service policy (S222 to S226).

Accordingly, when transmitting/receiving data, the domain masters transmit/receive data according to Tx/Rx synchronization achieved by the interference mitigation apparatus 100, and the domain maters transmit/receive data according to the grouping performed by the interference mitigation apparatus 100 (S228).

As described, the domain masters transmit/receive data according to the Tx/Rx synchronization achieved by the synchronizing unit 134, and the domain masters grouped in the same group do not simultaneously transmit/receive data since there is much interference on transmission lines. Accordingly, interference associated with data transmission/reception between the adjacent devices can be minimized.

As described, in accordance with at least one embodiment, the interference mitigation apparatus pairs the domain masters and the relay terminals by the pairing pulse signal, groups the domain masters with much interference based on a result of estimating the channel, and controls the grouped domain maters to transmit/receive data. Therefore, interference on the transmission lines can be minimized.

In addition, the interference mitigation apparatus may i) control transmitting and receiving data according to the Tx/Rx synchronization achieved by the domain masters and the relay terminal and ii) control the domain masters belonging to the same groups not to simultaneously transmit/receive data. Accordingly, interference on the transmission lines can be minimized.

The foregoing exemplary embodiments of the present disclosure are not implemented only by an apparatus and a method, and therefore may be realized by programs realizing functions corresponding to the configuration of the exemplary embodiment of the present disclosure or recording media on which the programs are recorded. Such recording media may be executed in a user terminal as well as a server.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

The invention claimed is:

1. A method for mitigating, by an interference mitigation apparatus, interference on a home network transmission line, the method comprising:
    pairing domain masters with relay terminals by a signal having a unique frequency;
    grouping the domain masters;
    performing Tx/Rx synchronization between the domain masters and the relay terminals; and
    controlling the domain masters and the relay terminals to transmit and receive data according to the Tx/Rx synchronization,
    wherein the controlling comprises controlling the domain masters of a same groups not to simultaneously transmit/receive data.

2. The method of claim 1, wherein the pairing includes
    transmitting, by the domain masters, a pairing pulse signal pre-allocated to each port of a respective one of the domain masters to the relay terminals, and
    receiving, by the domain masters, the pairing pulse signal including information about the relay terminals and selecting the relay terminals to be paired for each domain master.

3. The method of claim 1, wherein the grouping of the domain masters includes grouping the domain masters causing interference by using status information of channels.

4. The method of claim 3, wherein the status information of the channels includes information estimated by comparing test signals transmitted/received between the domain masters and the relay terminals, which are paired.

5. The method of claim 1, further comprising:
    between the pairing and the grouping of the domain masters, estimating channels by comparing test signals transmitted/received between the domain masters and the relay terminals, which are paired,
    wherein the estimating of the channels includes
    instructing the domain masters to transmit a PROBE frame for channel estimation as a test signal,
    receiving the PROBE frame from the relay terminals paired with the domain masters, and
    estimating channels by comparing the received PROBE frame with a predetermined PROBE frame.

6. The method of claim 1, wherein the performing the Tx/Rx synchronization includes performing the Tx/Rx synchronization by varying a ratio of a downlink and an uplink according to an amount of data being queued.

7. The method of claim 6, wherein the performing the Tx/Rx synchronization further includes
    providing a media access control (MAC) cycle synchronization signal by varying the ratio of the downlink and the uplink according to the amount of data being queued, when bandwidths and ratio of the downlink and uplink are different.

8. An apparatus for interference mitigation comprising:
    a pairing unit configured to pair domain masters with relay terminals by transmitting/receiving a signal with a unique frequency;
    a control unit configured to group the domain masters using status information of channels and to control the grouped domain masters to transmit/receive data,
    wherein the control unit includes a grouping unit configured to group the domain masters causing interference and a synchronizing unit configured to perform Tx/Rx synchronization between the domain master and the relay terminal, which are paired, and
    wherein the control unit is configured to control the domain masters and the relay terminals to transmit/receive data according to the Tx/Rx synchronization and to control the grouped domain masters not to simultaneously transmit/receive data.

9. The apparatus of claim 8, wherein the grouping unit groups the domain masters causing interference by using the status information of the channels, and
    the status information of the channels includes information that is estimated by comparing test signals transmitted/received between the domain masters and the relay terminals, which are paired.

10. The apparatus of claim 8, further comprising
    a channel estimation unit configured to estimate channels by comparing test signals transmitted/received between the domain masters and the relay terminals which are paired.

11. The apparatus of claim 10, wherein the channel estimation unit includes a comparing unit that transmits/receives a PROBE frame between the domain masters and the relay terminals, which are paired, and compares the PROBE frame received by the domain masters with a predetermined PROBE frame.

12. The apparatus of claim 9, wherein, when bandwidths and ratios of a downlink and a uplink are different between the domain masters and the relay terminals which are paired, the synchronizing unit performs Tx/Rx synchronization by varying the ratios of the downlink and the uplink according to an amount of data being queued and by providing a synchronization signal including a media access control (MAC) cycle.

13. A communication system comprising:
    two or more relay terminals paired with domain masters and connected to the paired domain masters via transmission lines;
    an interference mitigation apparatus configured to register the relay terminals paired with the domain masters and synchronize the domain masters to transmit/receive data; and
    a server configured to calculate interference data of channels based on a channel status of each port of a respective one of the domain masters and provide the calculated the interference data to the interference mitigation apparatus to synchronize the domain masters.

14. The system of claim 13, wherein the interference mitigation apparatus is configured to group the domain masters based on the interference data such that the domain masters are not affected by interference.

15. The system of claim 14, wherein the interference mitigation apparatus is configured to control performing Tx/Rx synchronization of the grouped domain masters and allowing the grouped domain masters to transmit data to and to receive data from the relay terminals according to the Tx/Rx synchronization.

16. The system of claim 15, wherein the interference mitigation apparatus is configured to estimate the channel status of each port by using test signals transmitted/received between the domain masters and the relay terminals.

\* \* \* \* \*